United States Patent
Bos et al.

(10) Patent No.: US 9,268,548 B1
(45) Date of Patent: *Feb. 23, 2016

(54) MULTI-PLATFORM NETWORK-BASED SOFTWARE DISTRIBUTION

(71) Applicant: United Services Automobile Association (USAA), San Antonio, TX (US)

(72) Inventors: Aaron D. Bos, Helotes, TX (US); Michael S. McQuarrie, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,399

(22) Filed: Aug. 6, 2013

Related U.S. Application Data

(63) Continuation of application No. 11/782,188, filed on Jul. 24, 2007, now Pat. No. 8,505,005.

(51) Int. Cl.
*G06F 9/44* (2006.01)
*G06F 9/445* (2006.01)

(52) U.S. Cl.
CPC .. *G06F 8/61* (2013.01); *G06F 8/65* (2013.01); *G06F 8/67* (2013.01); *G06F 8/68* (2013.01); *G06F 8/71* (2013.01)

(58) Field of Classification Search
CPC .............. G06F 8/60; G06F 8/61; G06F 8/65; G06F 8/67; G06F 8/68; G06F 8/71
See application file for complete search history.

(56) References Cited

U.S. PATENT DOCUMENTS

| | | | |
|---|---|---|---|
| 5,671,412 A | 9/1997 | Christiano | |
| 6,049,670 A * | 4/2000 | Okada et al. | 717/177 |
| 6,282,712 B1 * | 8/2001 | Davis et al. | 717/170 |
| 6,286,041 B1 | 9/2001 | Collins, III et al. | |
| 6,735,757 B1 | 5/2004 | Kroening et al. | |

(Continued)

OTHER PUBLICATIONS

John B. Tyndall, "Building an Effective Software Development Process", 2012 ACM, SIGUCCS'12, Oct. 15-19, 201, Memphis, TN, USA, pp. 109-114; <http://dl.acm.org/results.cfm?h=1&source_query=&&cfid=553700895&cftoken=81597062>.*

(Continued)

*Primary Examiner* — Thuy Dao
*Assistant Examiner* — Ben C Wang
(74) *Attorney, Agent, or Firm* — Nixon Peabody LLP

(57) ABSTRACT

Methods and systems are disclosed for automatically installing software applications on multiple target computers having different computing platforms from a central location. The methods and systems provide an infrastructure comprising a centralized repository and server and a plurality of remote target computers. The centralized repository stores platform-specific installation files for each software application and computing platform of interest, and one or more non-platform-specific deploy jobs for installing the software applications. The non-platform-specific deploy jobs allows a user to automatically install one or more software applications on any target computer regardless of computing platform, and to reuse any installation logic that may have been custom-developed for the software applications. A common command syntax is created that may be used to define and execute the deploy jobs across the multiple computing platforms.

7 Claims, 8 Drawing Sheets

(56) References Cited

U.S. PATENT DOCUMENTS

| | | | |
|---|---|---|---|
| 6,854,112 B2 | 2/2005 | Crespo et al. | |
| 6,983,262 B1 | 1/2006 | Ito | |
| 7,062,765 B1* | 6/2006 | Pitzel et al. | 717/177 |
| 7,124,409 B2* | 10/2006 | Davis et al. | 717/178 |
| 7,735,080 B2* | 6/2010 | Barturen et al. | 717/177 |
| 8,001,083 B1* | 8/2011 | Offer | 707/636 |
| 8,171,470 B2* | 5/2012 | Goldman et al. | 717/168 |
| 8,255,903 B2* | 8/2012 | Williams et al. | 717/174 |
| 8,375,381 B1* | 2/2013 | Clark et al. | 717/170 |
| 8,505,005 B1 | 8/2013 | Bos et al. | |
| 8,572,547 B1* | 10/2013 | Urh et al. | 717/100 |
| 8,607,223 B2* | 12/2013 | Fors et al. | 717/174 |
| 2002/0124245 A1 | 9/2002 | Maddux et al. | |
| 2002/0147974 A1 | 10/2002 | Wookey | |
| 2002/0174422 A1 | 11/2002 | Kelley et al. | |
| 2002/0188941 A1 | 12/2002 | Cicciarelli et al. | |
| 2003/0163807 A1 | 8/2003 | Drake et al. | |
| 2004/0059703 A1* | 3/2004 | Chappell et al. | 707/1 |
| 2004/0088697 A1* | 5/2004 | Schwartz et al. | 717/168 |
| 2004/0117338 A1 | 6/2004 | Kennedy et al. | |
| 2005/0102666 A1* | 5/2005 | Barta et al. | 717/174 |
| 2005/0102667 A1* | 5/2005 | Barta et al. | 717/174 |
| 2005/0120331 A1* | 6/2005 | Asare et al. | 717/104 |
| 2005/0120344 A1* | 6/2005 | Asare et al. | 717/174 |
| 2005/0120347 A1 | 6/2005 | Asare et al. | |
| 2005/0216902 A1 | 9/2005 | Schaefer | |
| 2005/0240921 A1* | 10/2005 | Barker et al. | 717/177 |
| 2007/0006222 A1* | 1/2007 | Maier et al. | 717/174 |
| 2007/0050404 A1* | 3/2007 | Hunter et al. | 707/103 R |
| 2007/0168940 A1 | 7/2007 | Lunawat | |
| 2008/0028385 A1* | 1/2008 | Brown et al. | 717/170 |
| 2008/0028390 A1 | 1/2008 | Fors et al. | |
| 2008/0120400 A1* | 5/2008 | Keller et al. | 709/223 |
| 2008/0127175 A1 | 5/2008 | Naranjo et al. | |
| 2009/0183138 A1* | 7/2009 | Loos et al. | 717/177 |
| 2009/0282403 A1 | 11/2009 | Poole et al. | |
| 2011/0041079 A1 | 2/2011 | Rive et al. | |
| 2011/0202905 A1* | 8/2011 | Mahajan | 717/168 |
| 2011/0209128 A1* | 8/2011 | Nikara et al. | 717/177 |
| 2011/0225574 A1* | 9/2011 | Khalidi et al. | 717/168 |
| 2012/0246635 A1 | 9/2012 | Kennedy et al. | |

OTHER PUBLICATIONS

Dell, "Building Multi-Platform Images for Deploying Operating Systems on Dell Business Client Systems", Dell Inc., Aug. 2011, pp. 1-14; <http://en.community.dell.com/.../Building-Multiplatform-images-for-Dell-Client-systems.pdf . . . >.*

Tore Fjellheim, "Over-the-air Deployment of Applications in Multi-Platform Environment", 2006 IEEE, Software Engineering Conference, Apr. 18-21, 2006, Australian, pp. 1-10; <http://ieeexplore.ieee.org/stamp/stamp.jsp?tp=&arnumber=1615049>.*

Karandikar, et al. "Building Multiplatform images for Dell Client systems", Aug. 2011, Dell, Inc., A Dell Technical White Paper; 14 pgs., <en.community.dell.com/techcenter/extras/m/white.../download.aspx>.

Tyndall, John B. "Building an Effective Softward Deployment Process", 2012 ACM, SIGUCCS'12, Oct. 15-19, 2012, Memphis, Tennessee, USA, 5 pgs., <http://dl.acm.org/citation.cfm?doid=23824562382482>.

Fjellheim, Tore "Over-the-air Deployment of Applications in Multi-Platform Environments", 2006 IEEE, ASWEC'06, 10 pgs, <http://ieeexpore.ieee.org/stamp/stamp.jsp?tp=&arnumber=1615049>.

Technology Brief "Mac OS X Server: Network Install" Apple, 4 pgs. Mar. 2005.

Lederhos, M. "Electronic Software Distribution . . . One Piece of a Much Bigger Picture" Strategies, SoftwareBusinessOnline.com, May/Jun. 2004, 2 pgs.

Thio, C., et al. "Best Practices and Methodology for Electronic Software Distribution and Operating System Provisioning in an on Demand Business". IBM Redbooks, Nov. 2006, 210 pgs.

Business Wire, "Black Duck Software Expands Integration of protexIP/development 4.0 in Ready for IBM Rational Software Validation Program", Technology Marketing Corporation, Dec. 5, 2006, http://www.tmcnet.com/usumbit/2006/12/05/2137561.htm.

Business Wire, "Sassafras Simplifies Software Auditing & License Management; K2 Version 6.1 Simplifies Software License Compliance and Usage Tracking by Automatically Sorting Application Programs into Categories". Gale Group, Sep. 14, 2005, 2 pgs.

Cisco Systems, Inc. "How Licensing and Software Work in Cisco Unified Call Studio", Cisco Systems, Inc., Jun. 26, 2007, 4 pgs.

Riley, M. "A Special Guide to DRM and Software Activation Tools: Protect Data, Enforce Licenses". Software Development, Feb. 1, 2006, http://www.ddj.com/security/1844154715, 10 pgs.

\* cited by examiner

MULTI-PLATFORM NETWORK-BASED SOFTWARE DISTRIBUTION

CROSS-REFERENCE TO RELATED APPLICATIONS

This application is a continuation of U.S. patent application Ser. No. 11/782,188, filed Jul. 24, 2007, now U.S. Pat. No. 8,505,005, which is related in subject matter to, and incorporates herein by reference in its entirety, each of the following: U.S. patent application Ser. No. 11/782,214, filed Jul. 24, 2007; and U.S. patent application Ser. No. 11/782,216, filed Jul. 24, 2007.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to installation of software applications on computers and, more specifically, to systems and methods for automatically distributing the software applications across multiple platforms and locations.

BACKGROUND

Advances in software programming and computing technology have made increasingly sophisticated and feature-rich software applications available to consumers and businesses alike. These powerful software applications provide an expanding list of benefits, including improved accuracy, efficiency, and convenience for numerous tasks performed on a regular basis. Industry indicators predict this trend is likely to continue and may even accelerate in the years ahead.

However, as software applications become more sophisticated, their installation becomes correspondingly more complicated. This is particularly true where multiple software applications are used in conjunction with one another, such as Web hosting applications and database applications. As a result, the normal installation process of one application must often be modified to accommodate the other application. For example, the database application may need to be installed as a part of the installation of the Web hosting application, and so forth. Thus, a certain amount of installation logic or customization must often be applied to the installation of the first application.

Because of the foregoing, most companies retain a team of highly-skilled technical support personnel dedicated to setting up and installing software applications. The technical support personnel usually install and configure the software applications manually from one or more portable media, such as floppy disks or CD-ROMs. These portable media contain installation packages that include the files needed to run the software applications on the target computing system. An installation utility is usually provided with each installation package that extracts, copies, and configures the installation files to one or more predefined directories on the target computing system.

But manual installation can be tedious and time-consuming, especially for a company with hundreds or possibly thousands of computers. Attempts to automate the software installation process, however, have met with only limited success. For one thing, the same software application may require a different installation package for each computing platform, such as Windows, UNIX (Linux and AIX), and the like. And depending on the intended use of the target computers, each target computer may have different operating parameters, network configurations, and other settings. In addition, commercial configuration tools that are capable of automatically installing a software application typically need to copy the entire installation package to the target computer, thus severely impacting the storage space on the target computer. Finally, existing configuration tools do not provide a way to reuse any of the installation logic or customization that may have been developed.

Accordingly, what is needed is a more efficient way to install software applications. More specifically, what is needed is a way to automatically install software applications on multiple target computers with different computing platforms from a central location.

SUMMARY

The disclosed embodiments are directed to methods and systems for automatically installing software applications on multiple target computers having different computing platforms from a central location. The methods and systems provide an infrastructure comprising a centralized repository, server, and a plurality of remote target computers. The centralized repository stores platform-specific installation files for each software application and computing platform of interest, and one or more non-platform-specific deploy jobs for installing the software applications. The non-platform-specific deploy jobs allows a user to automatically install one or more software applications on any target computer regardless of computing platform, and to reuse any installation logic that may have been custom-developed for the software applications. A common command syntax is created that may be used to define and execute the deploy jobs across the multiple computing platforms.

BRIEF DESCRIPTION OF THE DRAWINGS

The foregoing and other advantages of the invention will become apparent from the following detailed description and upon reference to the drawings, wherein.

DETAILED DESCRIPTION

Figure 1:
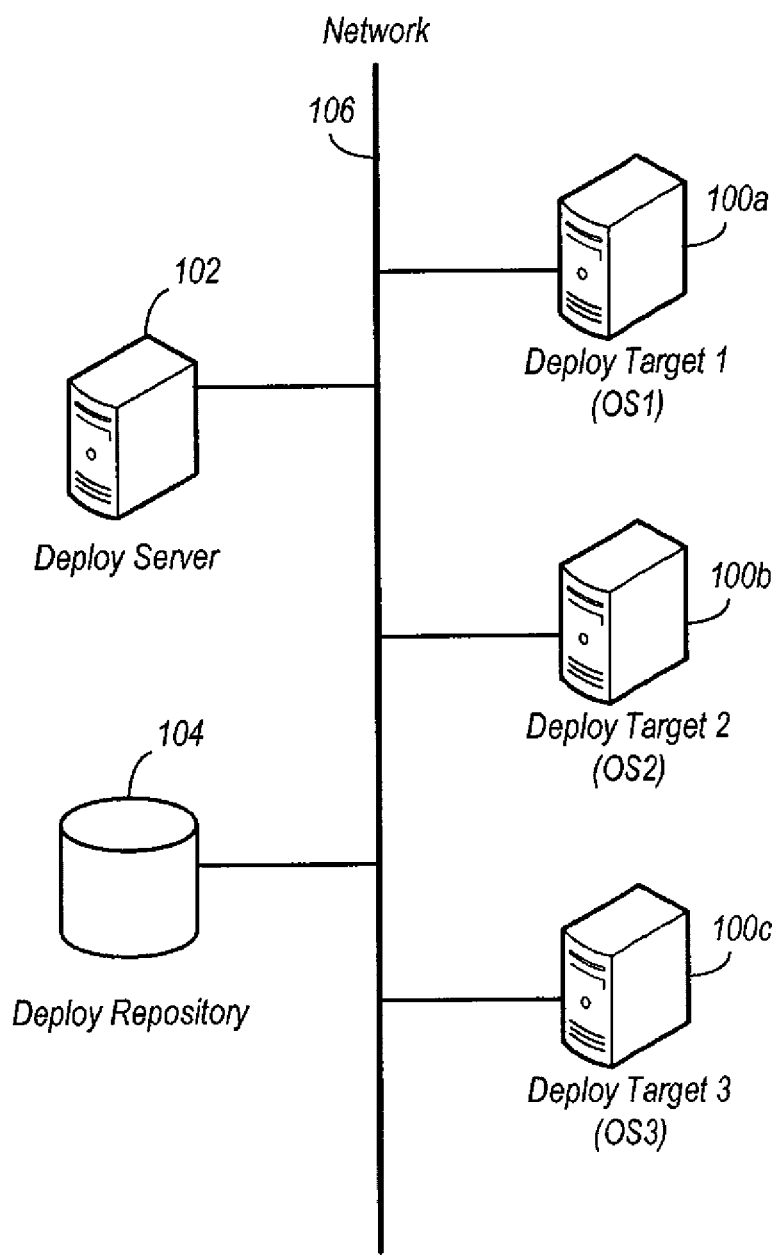
FIG. 1 illustrates an exemplary infrastructure for automatically installing software applications according to the disclosed embodiments.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, maybe executed substantially concurrently or the operations may be executed in the reverse order, depending on the functionality/acts/structure involved.

Referring now to FIG. 1, an infrastructure is shown for automatically installing software applications on multiple target computers having different computing platforms or operating systems from a central location. As used herein, the term "automatically" generally means non-interactive; that is, no user input is required during the installation process. The term "install" generally refers to the extraction, expansion, copying, configuring, and/or arranging of application files on the computer. Installation mayor may not require execution of an installation utility; that is, the installation may involve manually or automatically copying application files directly to certain directories. The software applications may be any software applications known to those having ordinary skill in the art, including publicly-available applications from software vendors, such as Microsoft, IBM, Oracle, and the like, as well as applications custom-developed for a particular company.

In the example of FIG. 1, the infrastructure includes a plurality of computing systems, called deploy targets 100*a*, 100*b*, and 100*e*, on which one or more software applications may be installed. The deploy targets 100*a*-*c* may be any suitable computers known to those having ordinary skill in the art, including personal computers, servers, workstations, mainframes, and the like. Each deploy target 100*a*-*c* may be physically located in the same or a different geographical location relative to other deploy targets 100*a*-*c* and may have the same or a different computing platform. The computing platforms are shown here as OS1, OS2, and OS3 and may include, for example, Windows, UNIX (including Linux and AIX), and the like.

The infrastructure of FIG. 1 also includes a centralized deploy server 102 and deploy repository 104. The deploy server 102, like the deploy targets 100*a*-*c*, may be any suitable server known to those having ordinary skill in the art, including a file server, Web server, application server, and the like. The deploy repository 104 may similarly be one or more repositories known to those having ordinary skill in the art that can provide storage for the software applications, or rather the installation packages therefor. Finally, a network 106, which may be a local area network (LAN), wide area network (WAN), virtual private network (VPN), or any suitable network known to those having ordinary skill in the art, may connect the deploy targets 100*a*-*c*, deploy server 102, and deploy repository 104 to one another.

In operation, when a software application is to be installed on a deploy target 100*a*-*c*, information is collected about the deploy target 100*a*-*c*, including the specific computing platform on the deploy target 100*a*-*c*. This information is then used to automatically execute a deploy job stored on the deploy repository 104 to install the software application on the deploy target 100*a*-*c*. The deploy job is configured to find the appropriate installation package from the deploy repository 104 for installing the software application on the deploy target 100*a*-*c*. Any special configurations or customizations of the software application may also be applied at this time. Furthermore, any flow control or installation logic developed for the software application may also be automatically invoked from the deploy repository 104 and applied during the installation. In the event the installation logic involves additional installation logic, the additional installation logic may also be invoked from the deploy repository 104 and applied at this time. Thus, multiple iterations of installation logic may be called from the deploy repository 104 and applied as needed.

Figure 2:
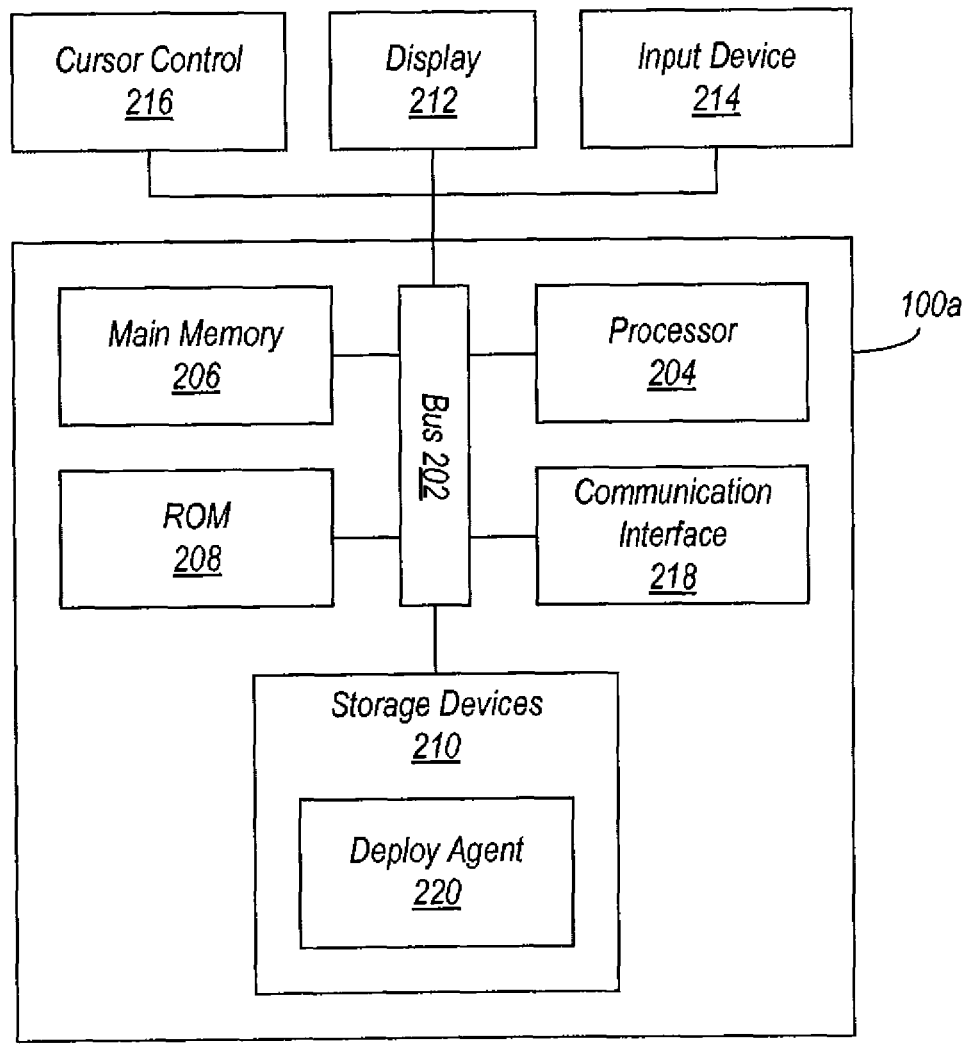
FIG. 2 illustrates an exemplary system capable of having software applications automatically installed thereon according to the disclosed embodiments.

FIG. 2 illustrates one of the deploy targets 100a-c in more detail according to the disclosed embodiments, specifically the first deploy target 100a. The other deploy targets 100b-c may be the same or similar to the first deploy target 100a and are therefore not described in detail here. Any suitable computer known to those having ordinary skill in the art may be used as the deploy target 100a, including a personal computer, workstation, server, mainframe, and the like. Such a deploy target 100a typically includes a bus 202 or other communication mechanism for communicating information and a processor 204 coupled with the bus 202 for processing information. The deploy target 100a may also include a main memory 206, such as a random access memory (RAM) or other dynamic storage device, coupled to the bus 202 for storing computer-readable instructions to be executed by the processor 204. The main memory 206 may also be used for storing temporary variables or other intermediate information during execution of the instructions to be executed by the processor 204. The deploy target 100a may further include a read-only memory (ROM) 208 or other static storage device coupled to the bus 202 for storing static information and instructions for the processor 204. A computer-readable storage device 210, such as a magnetic, optical, or solid state device, may be coupled to the bus 202 for storing information and instructions for the processor 204.

The deploy target 100a may be coupled via the bus 202 to a display 212, such as a cathode ray tube (CRT) or liquid crystal display (LCD), for displaying information to a user. An input device 214, including, for example, alphanumeric and other keys, may be coupled to the bus 202 for communicating information and command selections to the processor 204. Another type of user input device may be a cursor control 216, such as a mouse, a trackball, or cursor direction keys for communicating direction information and command selections to the processor 204, and for controlling cursor movement on the display 212. The cursor control 216 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 204 and/or other components. Similarly, the term "computer-readable medium" refers to any storage medium that may be used to store the computer-readable instructions. Such a medium may take many forms, including, but not limited to, non volatile media, volatile media, and transmission media. Non volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer-readable media may be involved in carrying one or more sequences of one or more instructions to the processor 204 for execution. For example, the instructions may initially be borne on a magnetic disk of a remote computer. The remote computer can load the instructions into its dynamic memory and send the instructions over a telephone line using a modem. A modem local to the deploy target 100a can receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 206, from which the processor 204 retrieves and executes the instructions. The instructions received by the main memory 206 may optionally be stored on the storage device 210 either before or after execution by the processor 204.

The deploy target 100a may also include a communication interface 218 coupled to the bus 202. The communication interface 218 typically provides a two way data communication coupling between the deploy target 100a and the network 106. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. Regardless of the specific implementation, the main function of the communication interface 218 is to send and receive electrical, electromagnetic, optical, or other signals that carry digital data streams representing various types of information.

In accordance with the disclosed embodiments, a deploy agent 220, or rather the computer-readable instructions therefor, may reside on the storage device 210. The deploy agent 220 may then be executed, either manually or as part of an automated procedure, to facilitate automatic installation of one or more software applications on the deploy target 100a. Such a deploy agent 220 may be downloaded to the storage device 210 from the deploy server 102 on an as-needed basis for installation of a software application, or it may be stored on the storage device 210 beforehand at the time the computing platform is initially installed on the deploy target 100a.

The particular deploy agent 220 placed on the storage device 210 may depend on the intended use of the deploy target 100a. Thus, for example, a deploy target 100a that is to be used as a Web server may receive one type of deploy agent 220, whereas a deploy target 100a that is to be used as a directory server may receive another type of deploy agent, and so forth. In some embodiments, however, instead of downloading based on intended usage, it is also possible to configure the deploy agents 220 to install an individual software application. In that case, users may pick and choose the deploy agents 220 to be downloaded based on the software application for which they are configured to install rather than the intended usage of the deploy target 100a. Additional information regarding the deploy agent 220 is provided further below.

All the deploy agents 220 are non-platform-specific, meaning any deploy agent 220 may be used with any computing platform, provided the platform supports the language of the deploy agent 220 (as opposed to the functionality of the deploy agent 220). In addition, each deploy agent 220 is independent of the software application it is configured to install insofar as the deploy agent 220 controls the overall installation process, not the installation utility of the software application. Thus, for example, if the installation is likely to result in an error for a given deploy target 100a, the deploy agent 220 may cause the computing platform of the deploy target 100a to automatically override the error and continue installing rather than abort the installation.

Figure 3:
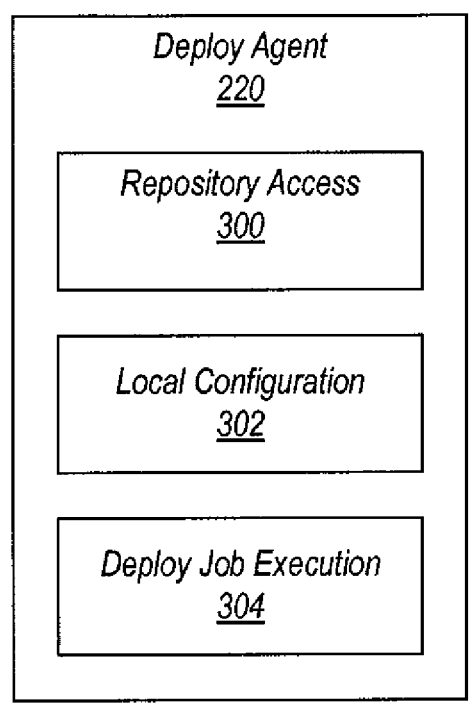
FIG. 3 illustrates an exemplary agent on the system of FIG. 2 for facilitating automatic installation of software applications according to the disclosed embodiments.

Referring to FIG. 3, in one embodiment, the deploy agent 220 comprises a number of functional components, including a repository access module 300, a local configuration module 302, and a deploy job execution module 304. These functional components are preferably implemented using a shell scripting language, such as KornShell, for reasons that are described later herein with respect to FIG. 4. Note that although the various functional components 300-304 of the deploy agent 220 have been shown in discrete units in FIG. 3, those having ordinary skill in the art will understand that two or more of these components may be combined into a single component, and that any individual component may be divided into several constituent components, without departing from the disclosed embodiments.

In general, the repository access module 300 is responsible for connecting the centralized deploy repository 104 to the remote deploy target 100a over the network 106. In some embodiments, the repository access module 300 may perform this function using the Network File System (NFS) protocol. The NFS protocol connects the deploy repository 104 to the deploy target 100a as a shared drive, thus making the files and directories of the deploy repository 104 available to the deploy target 100a as a shared folder. Of course, those having ordinary skill in the art will understand that other file sharing protocols besides NFS may certainly be used without departing from the scope of the disclosed embodiments.

The local configuration module 302 is responsible for collecting various types of information about the deploy target 100a, including the particular computing platform thereof and, if applicable, the specific version number of the computing platform. The local configuration module 302 may collect the above information by reading it from one or more designated files residing on the deploy target 100a (e.g., in the main memory 206, ROM 208, and/or storage devices 210), including one or more files of the computing platform on the deploy target 100a. The configuration module 302 may alternatively extract the information from the deploy target 100a by executing various commands known to those having ordinary skill in the art. This information may then be used, as explained further below, to access and execute the appropriate installation packages on the deploy repository 104 for the computing platform. In some embodiments, the collected information may also be used by the local configuration module 302 to set various parameters on the deploy target 100a to configure the deploy target 100a for its intended use.

The deploy job execution module 304 is responsible for automatically invoking and executing a designated deploy job. The particular deploy job invoked and executed by the deploy job execution module 304 may depend on the intended use of the particular deploy target 100a. In some embodiments, however, the deploy job execution module 304 may receive the name of the deploy job to be executed from the deploy server 104 as an argument when the deploy server 104 invokes the deploy agent 220. It is also possible to preprogram a deploy agent 220 (which may be stored in the deploy repository 104) with a particular deploy job so that the deploy job is already contained in the deploy agent 220 when it is downloaded to the deploy target 100a.

Because the deploy jobs are non-platform-specific, once a deploy job has been defined, it may be used for any computing platform, provided the platform supports the programming language in which the deploy job was written. But because the installation packages are platform-specific, whichever deploy job is invoked, the deploy job execution module 304 is configured to pass the computing platform information collected by the local configuration module 302 to that deploy job. The deploy job thereafter selects the appropriate installation package for the deploy target 100a from the deploy repository 104 based on the computing platform information.

Figure 4:
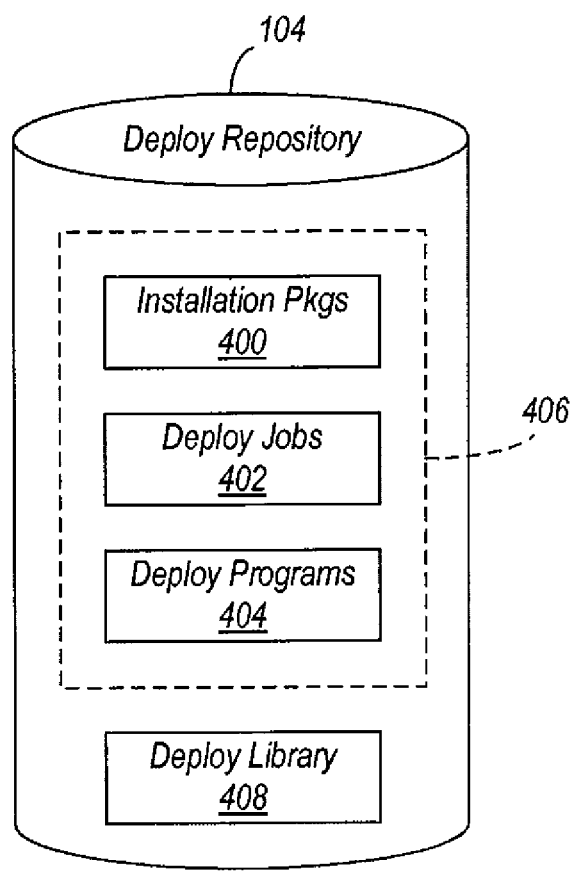
FIG. 4 illustrates an exemplary repository for facilitating automatic installation of software applications according to the disclosed embodiments.

FIG. 4 illustrates the centralized deploy repository 104 in more detail. As can be seen, the deploy repository 104 may contain a plurality of installation packages 400, one package for each software application to be installed with each computing platform. In addition, the deploy repository 104 may also be provisioned with one or more deploy jobs 402 that are not specific to any computing platform. Each deploy job 402 may be composed of functions or commands to be executed by the deploy target 100a during installation of a software application. The deploy jobs 402 typically also specify one or more installation packages 400, and may possibly specify one or more additional deploy jobs 402, to be executed. Installation logic or flow control commands may also be contained in the deploy jobs 402.

In some embodiments, the deploy jobs 402 may also specify one or more deploy programs 404 to be executed during installation of the software application. Such deploy programs 404 may be script files and/or executable files and are typically designed to perform functions that are needed, but are not included in the installation packages 400. Examples of the types of functions that the deploy programs 404 may be used to perform include customization functions, such as configuration of either the deploy target 100a, the software application to be installed thereon, or both, for a particular usage.

The installation packages 400, deploy jobs 402, and deploy programs 404 described above may be generally referred to herein as deploy tasks 406. In general, any function and/or command that may be contained in or executed by the deploy jobs 402 and/or deploy programs 404 may be referred to as a deploy task 406. These functions and/or commands for the deploy programs 404 as well as the deploy jobs 402 may be built-in commands that are interpreted by an interpreter running on the computing platform, or they may be custom-defined commands added separately to the command interpreter. In the case of newly defined commands, these commands may be stored in a deploy library 408 of the deploy repository 104 where they may be invoked by the deploy jobs 402 and deploy programs 404 as needed. The installation packages 400, deploy jobs 402, deploy programs 404, and deploy library 408 are described further below.

The installation packages 400 are typically standard installation packages created by software vendors for each software application, but they may also be custom installation packages 400 specifically developed for a certain purpose. Such installation packages 400 are well known to those having ordinary skill in the art and is therefore described only briefly here. In general, the installation packages 400 contain the files needed for proper operation of a software application on one of the deploy targets 100a-c. Importantly, the installation packages 400 remain on the deploy repository 104 and are accessed remotely through the repository access module 300 (see FIG. 3); that is, they are not copied to the deploy target 100a, thereby minimizing any impact to the storage device 210 of the deploy target 100a. These files, which are typically in a compressed format to minimize size, may simply be extracted, copied, configured, and/or otherwise arranged on the deploy target 100a. If present, a native installation utility included with each installation package 400 by the vendor thereof may be run to facilitate the installation.

Whereas the installation packages 400 are usually platform-specific, the deploy jobs 402 are non-platform-specific. Instead, the deploy jobs 402 rely on arguments passed to them from the deploy job execution module 304 (see FIG. 3) for any platform-specific information. Thus, each deploy job 402 may be used with each computing platform of the deploy targets 100a-c, so long as the computing platform can support or otherwise interpret the commands employed in the deploy jobs 402. Such commands may include, for example, commands for changing directories, executing a script or executable file, running another deploy job, launching an installation package, automatically overriding installation errors, and the like. In preferred embodiments, the syntax for the commands is based on the KornShell language or variants thereof because, among other benefits, this language uses the same command syntax for both built-in commands and custom-defined commands. As a result, new commands may be added to KornShell with minimal effort and disruption to the user.

The program that interprets the KornShell language is commonly known to those having ordinary skill in the art as "ksh." Ksh was designed to be portable and has been ported to virtually every known UNIX computing platform and also several non-UNIX platforms, including IBM's MVS using OpenEdition. In addition, ksh is part of the Uwin (UNIX for Windows) software that is supported by Microsoft Windows 9x, Windows NT, and Windows 2000. This portability allows the deploy jobs 402 to be used with virtually any computing platform that supports the ksh interpreter program. Of course, other programming languages besides KornShell may certainly be used, such as C shell (csh) and its extension, T C shell (tcsh); the Bourne Shell (sh) and its extensions, Bourne Again Shell (bash); and the like. In general, any scripting language that allows a user to custom define new commands may be used for the deploy jobs 402, as well as the deploy agents 220 (see FIG. 2), without departing from the disclosed embodiments.

For essentially the same reasons, use of the KornShell language or variants thereof is also preferred for the deploy programs 404. Each deploy program 404, as mentioned above, is basically a series of commands that have been combined into a single file, which may be either a script file or an executable file. Like the deploy jobs 402, the deploy programs 404 may be non-platform-specific in that each deploy program 404 may be used with each computing platform of the deploy targets 100a-c, so long as the computing platform can support or otherwise interpret the command syntax employed in the deploy programs 404. However, the deploy programs 404 may also be designed to be executed specifically with a particular computing platform where it is advantageous to do so.

Finally, the deploy library 408 comprises a collection of functions or commands custom defined by a user, again, preferably in the KornShell language or variants thereof These commands may be invoked by the deploy jobs 402 and deploy programs 404 to perform various operations in connection with the installation of a software application. Examples of such functions or commands may include changing directories, executing a script or executable file, running another deploy job, launching an installation package, automatically overriding installation errors, and the like. When invoked, the commands generally search the deploy repository 104 for execution objects using as much specificity as possible based on the information passed from the deploy job execution module 304 (see FIG. 3). Only when specific execution objects are not found do the commands resort to less specific objects. Thus, for example, the install command is designed to search for the most specific version of an installation package for any given software application before resorting to other versions of the installation package.

An example of a typical deploy job 402, called "Deploy Job 1," is illustrated below in Example 1. As can be seen, Deploy Job 1 is comprised of a series of functions or commands, written here in pseudocode for readability purposes, that may be either built-in or custom-defined by the user. Note that the commands shown here are exemplary only and that one or more commands may be added to, deleted from, or otherwise rearranged in Example 1 without departing from the scope of the disclosed embodiments. The first command in Example 1 is an importing command that causes the deploy target 100a to link or otherwise make available the files and directories of the deploy repository 104 to the deploy target 100a. The next two commands in Deploy Job 1 cause the deploy target 100a to move to the "Tasks" area of the deploy repository 104 and to execute a particular deploy program 404, called "Deploy program 1."

"Deploy Job 1"

IMPORT deploy library
CHANGE to "Task" directory
RUN "Deploy program 1"
IF condition A, THEN
   Run "Deploy Job 2"
END IF
CHANGE to "ABC" directory
INSTALL "Package 3"

Example 1

The next command in Deploy Job 1 is a conditional command that allows any installation logic previously developed for the software application to be more easily reused. The particular conditional command here causes the deploy target 100a to make a determination as to whether a certain condition "A" has been satisfied. Such a condition may include, for example, whether certain parameters were set or whether certain files were found on the deploy target 100a. If the condition is satisfied, then another deploy job 402, called "Deploy Job 2" in this example, maybe run on the deploy target 100a. Likewise, Deploy Job 2 may also contain installation logic that may trigger execution of yet another deploy job 402, and so on. In this way, multiple deploy jobs 402 may be nested within each other and automatically executed as needed.

The final two commands in Example 1 cause the deploy target 100a to change to the "ABC" directory, which may be the ABC software application directory, and to install the "Package 3" installation package for that software application.

Figure 5:
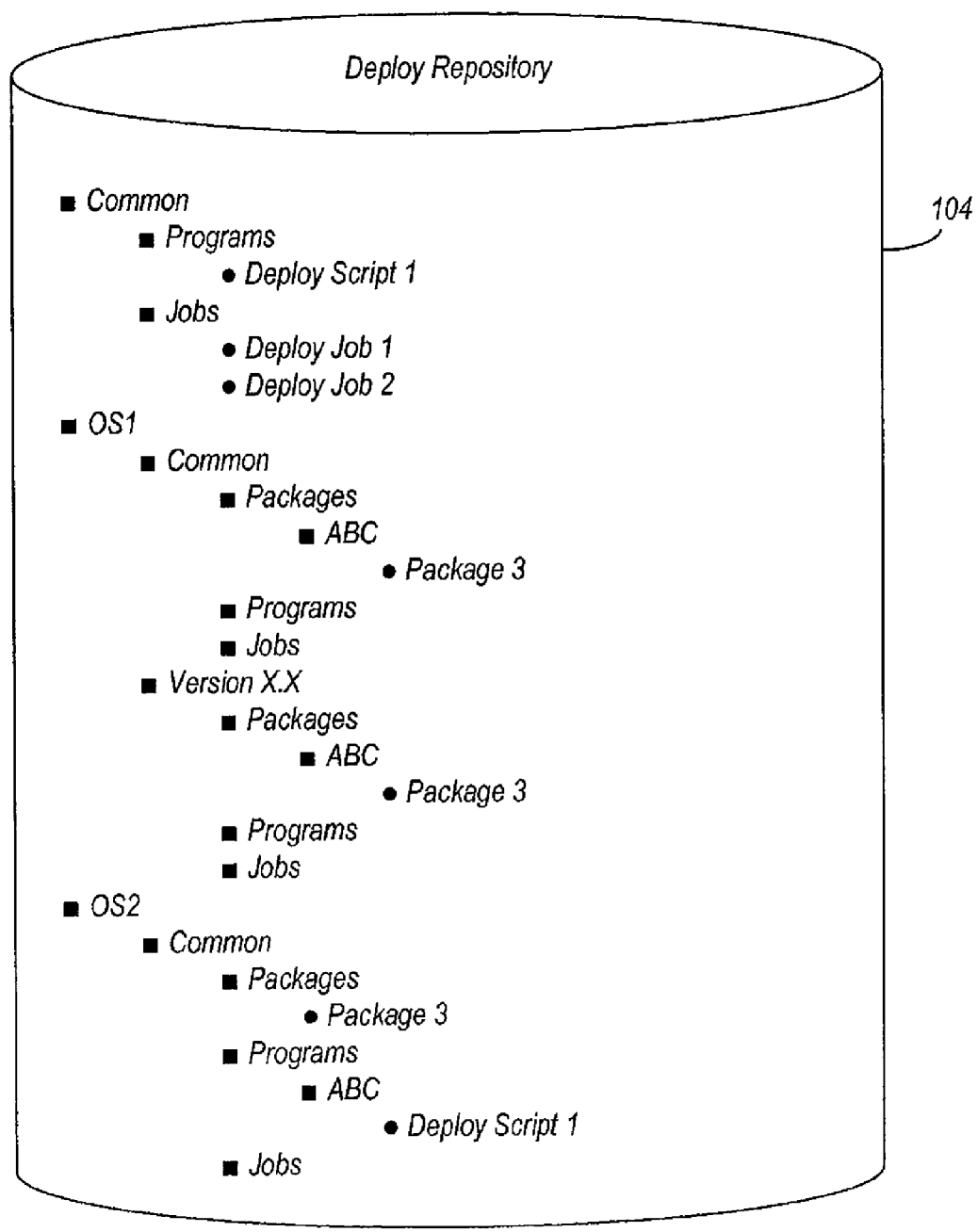
FIG. 5 illustrates an exemplary directory structure for the repository of FIG. 4 according to the disclosed embodiments.

FIG. 5 illustrates an exemplary hierarchy that may be used to organize storage of the various installation packages 400, deploy jobs 402, and deploy programs 404 on the deploy repository 104. Such a hierarchy is generally well known to those having ordinary skill in the art and is therefore described only briefly here. As can be seen, the exemplary hierarchy includes a Common storage area for storing non-platform-specific execution objects as well as several platform-specific storage areas, shown here as OS 1 and OS2. The storage areas are indicated by square bullets and the execution objects are indicated by round bullets in FIG. 5. Each storage area further includes one or more sub-areas, each sub-area storing a set of installation packages 400, deploy jobs 402, or deploy programs 404. Of course, other storage hierarchies known to those having ordinary skill in the art may certainly be used for the deploy repository 104 without departing from the scope of the disclosed embodiments.

Figure 6:
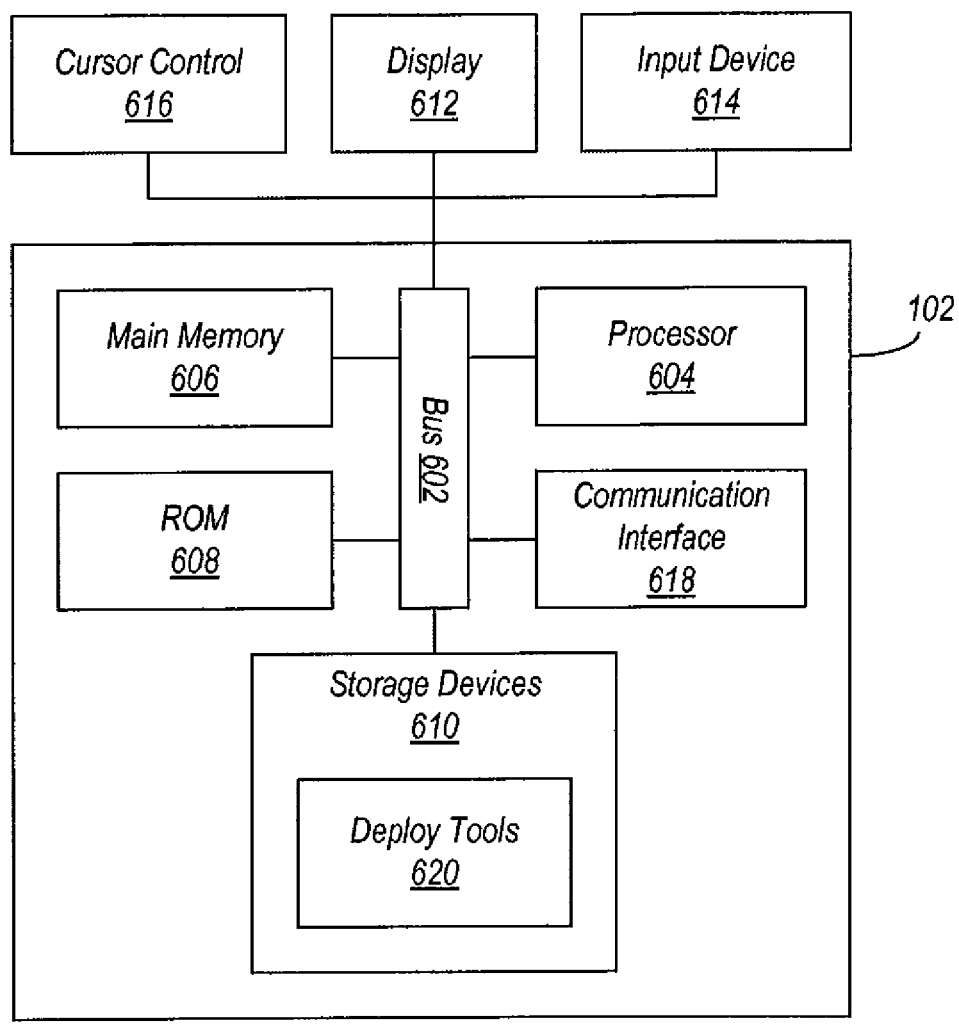
FIG. 6 illustrates an exemplary system capable of automatically installing software applications to a remote computer according to the disclosed embodiments.

Turning now to FIG. 6, an exemplary deploy server 102 is illustrated according to the disclosed embodiments. The deploy server 102 has many of the same functional components as the deploy targets 100a-c and is therefore not described in detail here. Suffice it to say, any suitable computer known to those having ordinary skill in the art may be used as the deploy server 102, including a personal computer, workstation, server, mainframe, and the like. In accordance with the disclosed embodiments, deploy tools 620, or rather the computer-readable instructions therefor, may reside on the storage device 610 of the deploy target 100a. These deploy tools 620 made then be executed to facilitate automatic installation of software applications on the deploy targets 100a-c.

Figure 7:
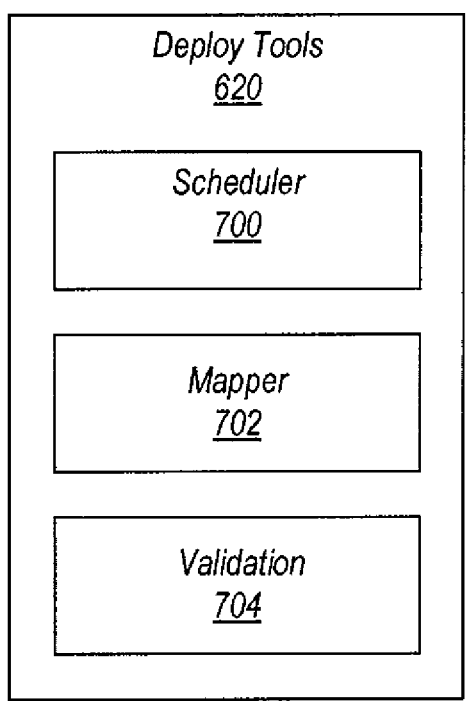
FIG. 7 illustrates exemplary tools on the system of FIG. 6 for facilitating automatic installation of software applications according to the disclosed embodiments.

FIG. 7 illustrates the deploy tools 620 of FIG. 6 in more detail. As can be seen, III one embodiment, the deploy tools 620 comprise a number of functional components, including a scheduler module 700, a mapper module 702, and a validation module 704. Such modules 700-704 may be implemented as either script files or as executable files using any suitable scripting language or programming language, respectively, without departing from the scope of the disclosed embodiments. These modules 700-704 allow a user to control which software applications are automatically installed to which deploy targets 100a-c as well as the timing of the installations. The modules 700-704 also provide the user with valuable information about the different installation packages 400, deploy jobs 402, and deploy programs 404. Following is a more detailed description of the various modules 700-704.

In general, the scheduler module 700 is responsible for scheduling automatic execution of the deploy agents 220 (see FIG. 2) on the deploy targets 100a-c. Thus, the scheduler module 700 allows a user to choose the time and date for executing a particular deploy agent 220 on a particular deploy target 100a-c. Multiple deploy agents 220 may also be scheduled for automatic execution on one or more deploy targets 100a-c. In some embodiments, the scheduler module 700 may also be used for scheduling automatic downloads of specific deploy agents 220 to one or more deploy targets 100a-c. In this regard, the scheduler module 700 may be part of a commercial configuration tool, such as Configuration Manager from BladeLogic, Inc. of Lexington, Mass. Finally, the scheduler module 700 may also be employed by the user to manually deploy and execute specific deploy agents 220 on one or more deploy targets 100a-c.

The mapper module 702 allows the user to automatically map the relationship between the different installation packages 400, deploy jobs 402, deploy programs 404, and in some cases, also of the deploy agent 220 (see FIGS. 2 and 4). This feature is particularly useful where a large number of installation packages 400, deploy jobs 402, deploy programs 404, and/or deploy agent 220 are present on the deploy repository 104. In some embodiments, the mapper module 702 may perform its function by generating a graphical representation showing the connections between the various installation packages 400, deploy jobs 402, and deploy programs 404. Any suitable graphical representation known to those having ordinary skill in the art may be used without departing from the scope of the disclosed embodiments. It is also possible for the mapper module 702 to perform its function by generating a textual description listing or otherwise describing the various relationships between the different installation packages 400, deploy jobs 402, and deploy programs 404.

Finally, the validation module 704 is responsible for confirming the presence of the various installation packages 400, deploy jobs 402, and deploy programs 404. In one embodiment, the validation module 704 performs this function by automatically scanning a specified deploy job 402 or deploy program 404, then searching the deploy repository 104 for any installation packages 400, deploy jobs 402, or deploy programs 404 found in the scan. The validation module 704 thereafter either confirms that the referenced installation packages 400, deploy jobs 402, or deploy programs 404 are present, or otherwise notifies the user that one or more of these items are missing, thus allowing the user to follow up as needed. In some embodiments, the validation module 704 may also allow the user to manually confirm a specific installation package 400, deploy job 402, or deploy program 404.

Figure 8:
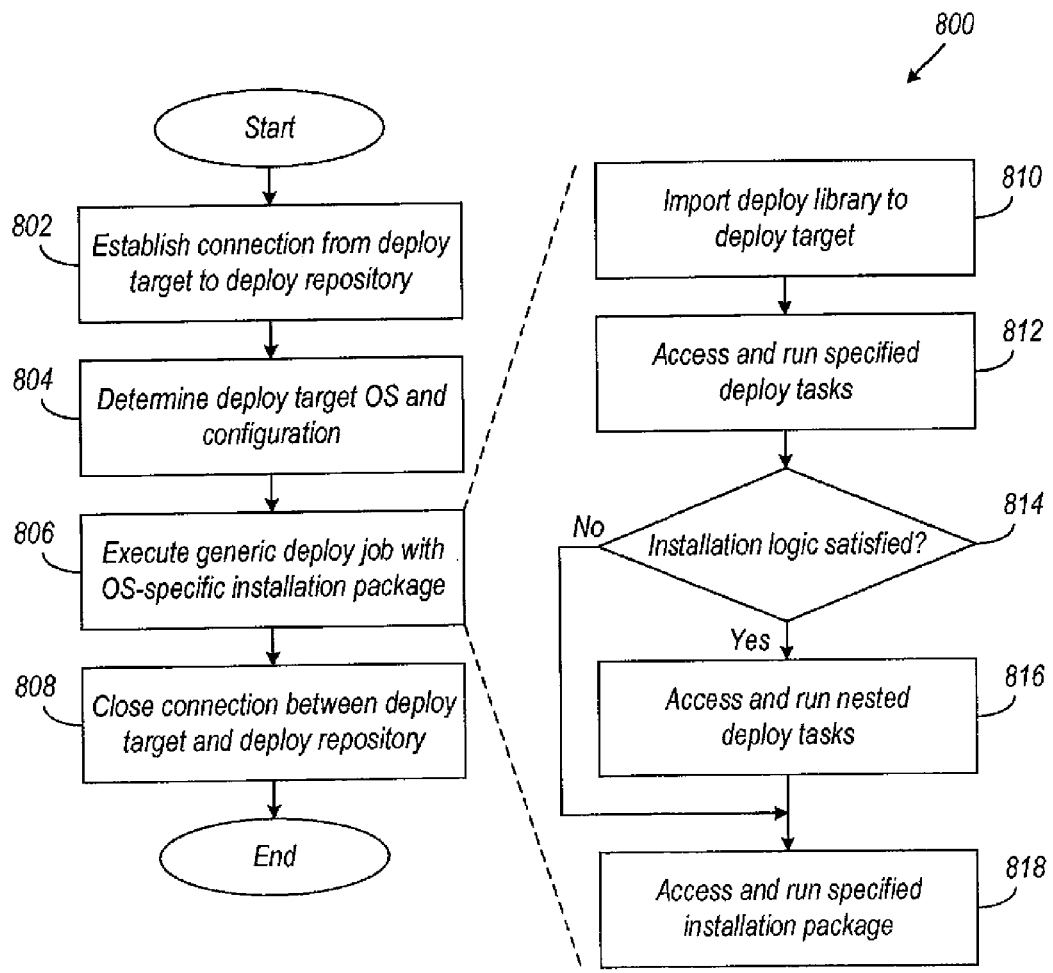
FIG. 8 illustrates an exemplary method for automatically installing software applications according to the disclosed embodiments.

Thus far, specific embodiments have been disclosed for automatically installing software applications on multiple deploy target having different computing platforms from a central location. Referring now to FIG. 8, general guidelines are shown in the form of a method 800 that may be used to implement the various embodiments disclosed above. As can be seen, the method 800 begins at block 802, where a connection is established between a remote deploy target and a centralized deploy repository over a network. Recall that the centralized deploy repository houses the deploy jobs, deploy programs, installation packages, and deploy library. At block 804, information about the deploy target is collected, including the computing platform thereof and any configuration information therefor. This information is then passed to a non-platform-specific deploy job for installing a software application using one or more platform-specific installation packages at block 806. Once the installation is complete, the connection between the deploy target in the deploy repository is closed at block 808.

The execution of the deploy job in block 806 is detailed in blocks 810-818. As can be seen, at block 810, the deploy job causes the deploy target to import the deploy library of the deploy repository to the deploy target. At block 812, the deploy job causes the deploy target to access and run any deploy program specified in the deploy job. Any installation logic that may have been developed for the software application may be applied via block 814. If the installation logic at this block is satisfied, then the deploy job causes the deploy target to access and run one or more nested deploy jobs at block 816. Otherwise, the block 816 is skipped, and the deploy job causes the deploy target to proceed directly to the immediately following block 818. At this block, the deploy job may cause the deploy target to access and install the specified installation package for the software application.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A non-transitory computer-readable medium having instructions stored thereon executable by a processor to:
    determine an operating system type for each of a plurality of remote target computing devices;
    access a deploy depository containing a plurality of deploy tasks comprising at least one of an installation package, a deploy job, and a deploy program;
    provide a scheduler module to allow a user to choose a time and date for executing the deploy tasks;
    search the deploy repository for execution objects to execute using a descending level of version specificity associated with the execution objects;

execute one or more of the plurality of deploy tasks on each of the plurality of remote target computing devices using the operating system type for each target computing device; and generating with a mapper module a representation showing connections between the at least one of an installation package, a deploy job and a deploy program.

2. The computer-readable medium of claim 1, wherein each deploy job includes one or more of the following functions: run a script file, run an executable file, change a directory, run an installation file, and override an installation error.

3. The computer-readable medium of claim 1, wherein the instructions include instructions executable by a processor to pass the operating system type as an argument to one or more of the installation tasks.

4. The computer-readable medium of claim 1, wherein the one or more of the plurality of installation tasks are combined into one or more files and the executing of the one or more of the plurality of installation tasks comprises executing the one or more files.

5. The computer-readable medium of claim 1, wherein the plurality of installation tasks comprise custom-defined functions written using a scripting language.

6. The computer-readable medium of claim 5, wherein the custom-defined functions have a command syntax that is substantially the same as a command syntax for built-in functions.

7. The system of claim 1 wherein the representation is textual or graphical.

* * * * *